United States Patent [19]

Messina

[11] Patent Number: 4,462,825
[45] Date of Patent: Jul. 31, 1984

[54] METHOD FOR INCREASING THE SCRAP MELTING CAPABILITY OF METAL REFINING PROCESSES

[75] Inventor: Charles J. Messina, Valparaiso, Ind.

[73] Assignee: United States Steel Corporation, Pittsburgh, Pa.

[21] Appl. No.: 528,377

[22] Filed: Sep. 1, 1983

[51] Int. Cl.³ .............................................. C21C 5/34
[52] U.S. Cl. ............................................ 75/60; 75/59
[58] Field of Search ..................................... 75/59, 60

[56] References Cited

U.S. PATENT DOCUMENTS

| | | | |
|---|---|---|---|
| 3,839,017 | 10/1974 | Schempp | 75/60 |
| 3,895,784 | 7/1975 | Kolb et al. | 75/60 |
| 3,902,889 | 9/1975 | Malin | 75/60 |
| 3,953,199 | 4/1976 | Michaelis | 75/60 |
| 3,960,546 | 6/1976 | Rote et al. | 75/60 |
| 3,970,446 | 7/1976 | Kolb | 75/60 |
| 3,997,335 | 12/1976 | Kolb | 75/60 |
| 3,999,977 | 12/1976 | Kolb | 75/60 |
| 4,047,936 | 9/1977 | Chang | 75/60 |
| 4,178,173 | 12/1979 | Gorges | 75/60 |
| 4,195,985 | 4/1980 | Brotzmann | 75/60 |
| 4,201,572 | 5/1980 | Slamar | 75/60 |

Primary Examiner—Peter D. Rosenberg
Attorney, Agent, or Firm—William F. Riesmeyer, III

[57] ABSTRACT

In a metal refining process where oxygen is blown into the molten melt from both above and below, the oxygen serving to remove carbon impurities from the melt, and carbon monoxide being emitted from the melt and burned by the oxygen from above so as to add heat to the melt, the improvement in which the oxygen from above is introduced at a location exterior to an opening in a vessel above the melt. The invention is particularly suited for use with the Q-BOP steelmaking process.

13 Claims, 1 Drawing Figure

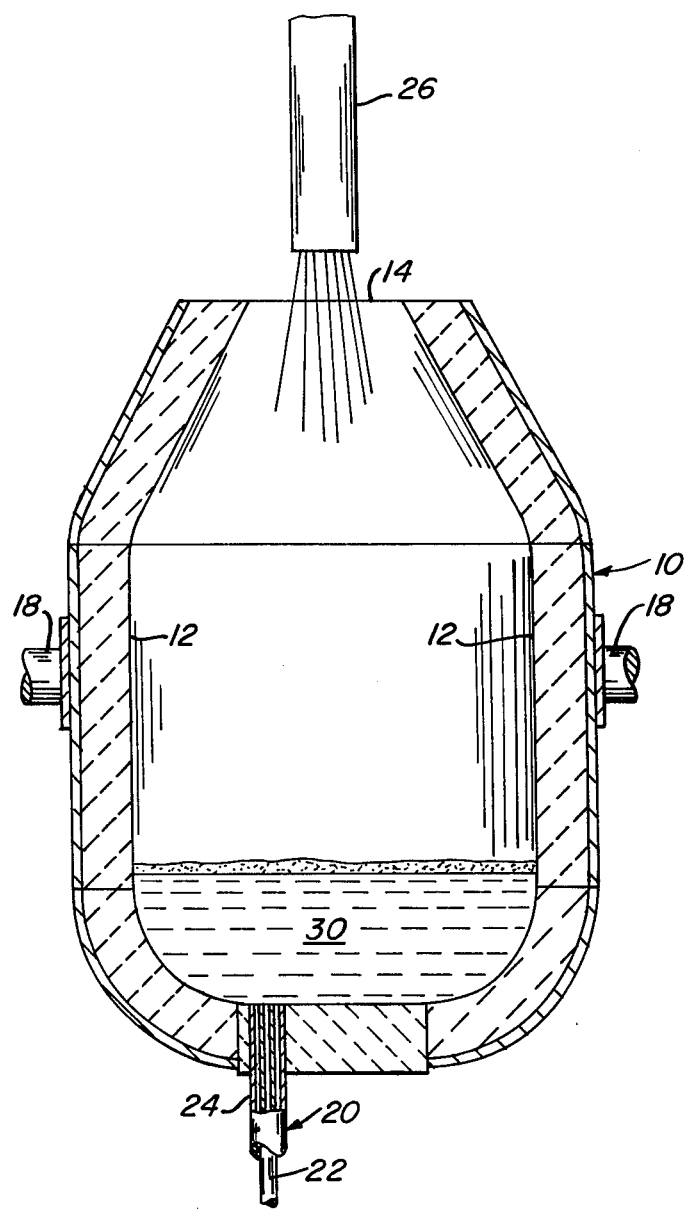

METHOD FOR INCREASING THE SCRAP MELTING CAPABILITY OF METAL REFINING PROCESSES

BACKGROUND OF THE INVENTION

This invention relates to metal refining processes in which a refining gas is blown into a bath of molten metal from both above and below to enhance the scrap melting capability of the process by combustion of gases emerging from the bath, and particularly to obtain such enhanced scrap melting capability without decreasing the life of refractories lining the vessel in which the process is carried out, especially as it relates to a Q-BOP or other bottom-blown steelmaking process.

The oxygen converter steelmaking processes permit production of steel in only a fraction of the time required in the formerly predominant open hearth process. A substantially higher proportion of molten hot metal is required in the charge of the oxygen converter processes in order to provide the heat necessary for refining. As a result of the increased use of molten hot metal, these oxygen processes suffer from the disadvantage that where a cheap supply of cold scrap is readily available, the most economical proportion of charge materials may not be used. Thus, it is important under some market conditions to increase the ability of the converter processes to utilize higher percentages of cold metal scrap in the charge.

Where increased scrap melting capability is beneficial, it has been proposed that the scrap be preheated either within the converter itself or in a separate furnace prior to charging into the converter. Both capital expenditures and operating costs would be increased if either of these procedures were to be used. It has been proposed that fuels may be burned above the bath during refining in order to provide additional heat and increase the scrap melting capability of the oxygen converter processes, particularly the bottom-blown processes. Since carbon monoxide is evolved from the bath during refining, it serves as a readily available source of fuel which may be utilized for this purpose. Thus, a secondary source of oxygen provided above the bath will cause combustion of the emerging CO generating additional heat for asbsorption by the bath.

U.S. Pat. No. 3,895,784, Kolb et al shows a Q-BOP converter having generally horizontal or slightly downwardly tilted side tuyeres for this purpose. The tuyeres are mounted at locations slightly above the bath level. In addition, tuyeres located at an upper level of the vessel are shown for the purpose of combusting CO in order to burn away solid deposits of metal commonly known as nose skulls. U.S. Pat. No. 3,960,546 also shows similar upper and lower tuyere configurations. A significant disadvantage to the use of side tuyeres is the adverse effect such use has on refractory life due to the high temperatures produced above the bath.

To overcome the problem of lower refractory life, changes in vessel dimensions have been proposed to increase the rate of absorption of heat by the molten bath. U.S. Pat. No. 4,201,572, Slamar indicates that a significant increase in the surface-to-volume ratio of the bath over that normally provided in basic oxygen furnace designs, would provide the desired rate of heat absorption. However, it would obviously be expensive to make changes in vessel dimensions. Moreover, this does not provide a solution to the problem for vessels presently used. U.S. Pat. No. 4,047,936, Chang shows tuyeres or lances located further above the bath level and tilted at greater angles so as to direct the secondary oxygen downwardly toward the bath. This reference also suggests that a vertical water-cooled lance extending downwardly into the vessel may alternatively be used to inject oxygen into the area above the bath. U.S. Pat. No. 4,195,985, Brotzmann indicates that the degree of heat absorption into the bath using such downwardly angled tuyeres or a vertical lance may be substantially increased by proper adjustment of the proportion of top and bottom oxygen flow and other variables. In this case it is suggested that high temperatures in the upper part of the vessel are not present so that a decrease in refractory life is not experienced. But the lance and tuyere configurations disclosed in Chang and the blowing conditions disclosed in Brotzmann do not prevent the formation of nose skulls. The present invention is directed to increasing the scrap melting capability of bottom-blown metal refining processes without decreasing refractory life and simultaneously preventing the formation of skulls in the cone and mouth of the vessel. U.S. Pat. No. 3,960,546, Brotzmann suggests that a single lance inserted through the vessel mouth may be effective for preventing formation of nose skulls but contains no suggestion that such a lance may be located above the vessel mouth rather than within it, nor that a lance in this area may be used to transfer heat to the bath increasing scrap melting capability of the process as well as preventing formation of nose skulls. It has been found quite unexpectedly that a secondary oxygen lance located outside the vessel will accomplish all of these objectives. It is also believed that greater scrap melting capability is achieved when the lance is located above the vessel as compared to within the vessel. To applicant's knowledge, no one has ever used a lance located outside the vessel for increasing the scrap melting capability of an oxygen-blown steelmaking process.

SUMMARY OF THE INVENTION

The present invention is of an improvement in a process for refining molten metals in which oxygen is introduced into a bath of the molten metal from a location below the bath level and also from a location spaced substantially thereabove. The oxygen introduced from above serves to burn carbon monoxide emerging from the bath and potentially add significant amounts of heat to the process. The process is especially suited for enhancing the proportion of solid scrap which may be included in the charge along with the molten metal to be refined. The improvement of this invention involves introducing the oxygen from above at a location exterior to a metallurgical vessel which contains the bath of molten metal to be refined therein. The term "exterior" refers to locations outside the outermost plane of an opening in the vessel. The opening itself should be located at a distance substantially above the bath level, preferably at least two (2) meters thereabove. The location at which the oxygen is introduced is spaced exteriorly from the opening a distance within the range of 1 mm to 1.5 meters therefrom. Of course the opening in the vessel must be of sufficient cross-section to permit unimpaired passage of the oxygen therethrough. And the length of the oxygen jet must be long enough to reach the molten metal bath. It is desirable that the oxygen be introduced at supersonic velocity at said exterior location. The oxygen may be introduced using a water-cooled lance mounted in a generally vertical orientation over the vessel opening. The process is particularly suited for the refining of molten iron to steel and especially for a Q-BOP type process where the oxygen from below is introduced through concentric pipe tuyeres, each oxygen stream issued through such tuyeres being surrounded by a shroud of coolant. Finally, the invention is especially useful for the refining of steel by the Q-BOP process where such process is carried out in a converter vessel of conventional elongated shape, such converter being rotatable about a horizontal transverse axis. The vessel has a mouth opening at its upper end and the oxygen from above is introduced at a location exterior to the mouth opening. Preferably, the oxygen in this latter process is introduced by a water-cooled lance having a Lavel nozzle for providing an oxygen stream of supersonic velocity.

BRIEF DESCRIPTION OF THE DRAWINGS

The sole FIGURE is a schematic representation of a conventional converter for the Q-BOP steelmaking process showing additionally apparatus for carrying out the present invention.

DESCRIPTION OF THE PREFERRED EMBODIMENT

The sole FIGURE shows a conventional Q-BOP steelmaking converter having a metal shell 10 with a refractory lining 12. The converter vessel also has a mouth opening 14 for the receipt of charge materials. The vessel is rotatable about a horizontal axis on a pair of trunnions 18. A plurality of tuyeres 20 are located in the vessel bottom consisting of concentric pipes 22, 24. Oxygen is introduced through the inner pipe 22 and a shroud of coolant fluid such as propane is introduced through outer pipe 24. According to this invention, a conventional water-cooled lance 26 was mounted in fixed position above the mouth opening of the vessel. The lance was fitted with a Laval nozzle for issuing a single stream of oxygen at supersonic velocity at the flow rates to be used. The length of the jet from the lance was sufficiently long to extend downwardly into the bath. It should be noted that a particular advantage of a fixed position lance is that it can be installed where only limited head room is available. The lance in our installation was installed in fixed position spaced 18-inches (about 46 cm) above the mouth of the vessel. The vessels in our installation are of conventional type for producing about 220 tons heats. Over the course of various trials it was found in our installation, as above described, a flow of about 6000 scfm oxygen through the top lance was necessary to prevent formation of nose skulls. At a flow of 2000 scfm, nose skulls formed making it necessary to periodically remove them before scrap charging. It appears desirable that the oxygen through the top lance be started at about the initiation of oxygen for refining through the tuyeres in the bottom of the vessel and that the oxygen from above be continued for at least the major portion of the remainder of the time during which oxygen is introduced from below the bath, preferably for the entire balance of the said time. The total oxygen from above should desirably be from 15 to 30% of the total oxygen introduced (which is equivalent to blowing oxygen from above at a rate equal to 17.64% to 42.86% of the rate at which oxygen is introduced from below the bath surface) in order to prevent formation of nose skulls. It will be apparent that various factors such as nozzle size, oxygen flow rate and spacing from the vessel mouth will affect the degree to which nose skulls are prevented from forming. The size and configuration of the vessel mouth opening are also factors to be considered. Finally, the angle and number of oxygen streams from the lance would be expected to influence skull formation as well as scrap melting capability and refractory wear. A tabulation of data on a series of heats made with and without using the lance is listed in Table I below.

TABLE I

| | HEATS WITH LANCE | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Heat Wt. (lbs.) | 440000 | 440000 | 440000 | 440000 | 440000 | 440000 | 440000 | 440000 | 440000 | 440000 | 440000 | 440000 |
| Scp Wt. (lbs.) | 154400 | 154300 | 154000 | 138800 | 134800 | 83600 | 124400 | 123200 | 119300 | 103000 | 107100 | 59000 |
| Hot Metal (lbs.) | 351900 | 351900 | 352300 | 365200 | 368900 | 415700 | 383300 | 385100 | 377700 | 402500 | 398700 | 441600 |
| Yield (%) | 87.608 | 87.625 | 87.605 | 87.993 | 88.045 | 88.831 | 87.353 | 87.252 | 89.256 | 87.744 | 87.676 | 88.604 |
| HM Si (%) | 0.82 | 0.79 | 0.85 | 0.44 | 0.36 | 0.43 | 0.77 | 0.86 | 0.720 | 0.38 | 0.47 | 0.43 |
| HM S | 0.030 | 0.034 | 0.042 | 0.024 | 0.030 | 0.024 | 0.035 | 0.022 | 0.030 | 0.040 | 0.030 | 0.024 |
| HM P | 0.090 | 0.088 | 0.101 | 0.078 | 0.070 | 0.088 | 0.094 | 0.088 | 0.090 | 0.081 | 0.094 | 0.088 |
| HM Mn | 0.76 | 0.80 | 0.69 | 0.69 | 0.650 | 0.740 | 0.720 | 0.66 | 0.074 | 0.660 | 0.720 | 0.740 |
| HM Temp (°F.) | 2490 | 2495 | 2480 | 2520 | 2535 | 2495 | 2500 | 2470 | 2495 | 2510 | 2480 | 2500 |
| TurnDown C | .020 | .023 | .027 | 0.021 | 0.019 | 0.70 | 0.024 | 0.021 | 0.028 | .031 | .022 | 0.78 |
| TurnDown Temp (°F.) | 2920 | 2925 | 2910 | 2935 | 2930 | 2855 | 2940 | 2920 | 2910 | 2920 | 2925 | 2850 |
| Burnt Lime | 20250 | 19600 | 21250 | 15000 | 15000 | 25000 | 20600 | 22900 | 18900 | 15000 | 15000 | 25000 |
| Dolomite | 6950 | 6650 | 6750 | 5250 | 4900 | 4700 | 6850 | 7800 | 6500 | 5000 | 5350 | 4750 |
| Spar | 0 | 0 | 0 | 0 | 0 | 0 | 0 | 0 | 0 | 0 | 0 | 6000 |
| Top $O_2$ Flow (scfm) | 6000 | 6000 | 6000 | 6000 | 6000 | 6000 | 0 | 0 | 0 | 0 | 0 | 0 |
| Bottom $O_2$ Flow (scfm) | 20000 | 20000 | 20000 | 20000 | 20000 | 20000 | 24000 | 24000 | 24000 | 24000 | 24000 | 24000 |
| Total $O_2$ (cu. ft.) | 388550 | 387900 | 388550 | 384000 | 384650 | 338500 | 380000 | 383000 | 371000 | 375000 | 375000 | 315500 |
| Scp % | 30.74 | 30.72 | 30.66 | 27.76 | 26.98 | 16.88 | 24.69 | 24.43 | 24.20 | 20.53 | 21.35 | 11.88 |

From the table it can be seen that heats 1, 2, 3, 7, 8 and 9 were of comparable high-silicon (about 0.8%) hot metal, (i.e. iron from the blast furnace). It should also be noted that heats 4, 5, 10 and 11 had low silicon hot metal. Finally, heats 6 and 12 had a higher turndown carbon than the other heats. The scrap melting capability of heats 1, 2 and 3 (31%) with the lance was considerably higher than that of heats 7, 8 and 9 (24.5%) without the lance. Similarly, the scrap melting capability of heats 4 and 5 (27%) was higher than that of heats 10 and 11 (21%) again due to use of the top lance. The same relationship was also found for the high-carbon turndown heats (6 and 12) where the scrap melt rate with the lance was 16.9% vs. 11.9% without the lance.

Over an extended period in which the lance was used, no significant decrease was noted in the refractory lining life of the vessel as indicated by the data in Table II below. It was also found that the use of the lance completely prevented formation of nose and cone skulls eliminating delays for the removal of such skulls prior to scrap charging.

TABLE II

HEATS PER VESSEL CAMPAIGN

| WITHOUT LANCE | | WITH LANCE | |
| --- | --- | --- | --- |
| Campaign | No. Heats | Campaign | No. Heats |
| A | 1295 | D | 1032 |
| B | 888 | E | 944 |
| C | 1162 | F | 1128 |
| AVERAGE | 1052 | | 1044 |

The invention is primarily directed to steelmaking processes carried out in BOP or Q-BOP type vessels, but conceivably may be used in other furnace designs. Although the invention has been demonstrated only for a steelmaking process, it is believed applicable as well to the refining of any metal in which oxygen is introduced from both above and below.

These and other embodiments of the invention will be apparent to those skilled in the art and are intended to be covered within the spirit and scope of the following appended claims.

I claim:

1. In the refining of a molten metal bath contained in a refining vessel of the type having a "mouth" at the top thereof, wherein a refining gas comprising oxygen (a) is injected below the surface of the bath, to combine with carbon in the molten metal, resulting in the evolution of carbon monoxide from the bath, and (b) is blown downwardly toward the bath from a nozzle above the bath surface to oxidize the carbon monoxide, forming high temperature gases above the bath surface, which high temperature gases serve to increase the heat content of the bath and its capability to melt solid additions made thereto, the formation of such high temperature gases having the undesirable side-effect of deteriorating the refractory lining of the vessel above the bath surface in vessels having a bath surface-to-volume ratio insufficient to prevent such deterioration, the improvement for materially decreasing the deterioration of said refractory lining while concomitantly materially increasing the heat content of the bath which comprises, blowing the downwardly directed refining gas comprising oxygen (i) through a nozzle, the lower end of which is located no lower than the lip of the vessel mouth, and (ii) at a rate in which the oxygen in the downwardly directed refining gas is within a range equal to 17.64% to 42.86% of the rate at which said oxygen is injected below the surface of the bath.

2. The process of claim 1 wherein the downwardly directed refining gas emerges from said nozzle at supersonic velocity.

3. The process of claim 1 wherein the molten metal in said bath comprises carbon-containing iron which is to be refined to steel.

4. The process of claim 1 wherein the nozzle for blowing the downwardly directed refining gas comprising oxygen is mounted in fixed position.

5. The process of claim 1 wherein the nozzle for blowing the downwardly directed refining gas comprising oxygen is spaced exteriorly above the mouth of the vessel a distance within the range of 1 mm to 1.5 meters.

6. The process of claim 2 wherein the downwardly directed refining gas emerges from said nozzle in a stream extending downwardly at least to the surface of the bath.

7. The process of claim 3 wherein at least one Q-BOP type tuyere is utilized in said refining vessel for injecting the refining gas comprising oxygen below the surface of the bath.

8. In the refining of a molten metal bath contained in a refining vessel of the type having a "mouth" at the top thereof, wherein a refining gas comprising oxygen (a) is injected below the surface of the bath, to combine with carbon in the molten metal, resulting in the evolution of carbon monoxide from the bath, and (b) is blown downwardly toward the bath from a nozzle above the bath surface to oxidize the carbon monoxide, forming high temperature gases above the bath surface, which high temperature gases serve to increase the heat content of the bath and its capability to melt solid additions made thereto, the formation of such high temperature gases having the undesirable side-effect of deteriorating the refractory lining of the vessel above the bath surface in vessels having a bath surface-to-volume ratio insufficient to prevent deterioration, the improvement for materially decreasing the deterioration of said refractory lining while concomitantly materially increasing the heat content of the bath which comprises, blowing the downwardly directed refining gas comprising oxygen (i) through a nozzle, the lower end of which is located exterior to the vessel mouth, and (ii) at a rate in which the oxygen in the downwardly directed refining gas is within a range equal to 17.64% to 42.86% of the rate at which said oxygen is injected below the surface of the bath, the downwardly directed refining gas emerging from said nozzle at supersonic velocity and flowing in a stream extending downwardly at least to the surface of the bath.

9. The process of claim 8 wherein the molten metal in said bath comprises carbon-containing iron which is to be refined to steel.

10. The process of claim 8 wherein the nozzle for blowing the downwardly directed refining gas comprising oxygen is mounted in fixed position.

11. The process of claim 8 wherein the nozzle for blowing the downwardly directed refining gas comprising oxygen is spaced exteriorly above the mouth of the vessel a distance within the range of 1 mm to 1.5 meters.

12. The process of claim 8 wherein at least one Q-BOP type tuyere is utilized in said refining vessel for injecting the refining gas comprising oxygen below the surface of the bath.

13. The process of claim 10 wherein the nozzle for blowing the downwardly directed refining gas comprising oxygen is spaced exteriorly above the mouth of the vessel a distance within the range of about 15 cm to about 75 cm.

* * * * *

UNITED STATES PATENT AND TRADEMARK OFFICE
CERTIFICATE OF CORRECTION

PATENT NO. : 4,462,825
DATED : July 31, 1984
INVENTOR(S) : Charles J. Messina

It is certified that error appears in the above-identified patent and that said Letters Patent are hereby corrected as shown below:

Columns 3 and 4, Line 36 --

Under Table I, heading for columns 1-6 should read --Heats With Lance--

Under Table I, heading for columns 7-12 should read --Heats Without Lance--

Signed and Sealed this

Twelfth Day of March 1985

[SEAL]

Attest:

DONALD J. QUIGG

Attesting Officer     Acting Commissioner of Patents and Trademarks